United States Patent
Okabayashi et al.

(10) Patent No.: US 7,895,369 B2
(45) Date of Patent: Feb. 22, 2011

(54) SEMICONDUCTOR MEMORY DEVICE AND METHOD OF CONTROLLING SEMICONDUCTOR MEMORY DEVICE

(75) Inventors: Hiroko Okabayashi, Tokyo (JP); Tetsuya Kaise, Tokyo (JP); Noriaki Emura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 125 days.

(21) Appl. No.: 12/398,693

(22) Filed: Mar. 5, 2009

(65) Prior Publication Data
US 2010/0017540 A1    Jan. 21, 2010

(30) Foreign Application Priority Data
Jul. 17, 2008 (JP) .............................. 2008-186305

(51) Int. Cl.
G06F 3/00    (2006.01)
G06F 13/00   (2006.01)

(52) U.S. Cl. ......................................... 710/14; 711/103
(58) Field of Classification Search .................. 710/14; 611/103
See application file for complete search history.

(56) References Cited

U.S. PATENT DOCUMENTS

| | | | | |
|---|---|---|---|---|
| 3,636,262 A | * | 1/1972 | Johnson | 379/279 |
| 4,958,377 A | * | 9/1990 | Takahashi | 382/218 |
| 4,985,756 A | * | 1/1991 | Kawabe et al. | 348/580 |
| 5,012,345 A | * | 4/1991 | Elworthy | 348/97 |
| 5,113,744 A | * | 5/1992 | Tanaka et al. | 84/634 |
| 6,430,723 B2 | * | 8/2002 | Kodama et al. | 714/770 |
| 6,594,172 B2 | * | 7/2003 | Abbott et al. | 365/63 |
| 6,893,267 B1 | * | 5/2005 | Yueh | 439/8 |
| 2002/0147882 A1 | * | 10/2002 | Pua et al. | 711/103 |

FOREIGN PATENT DOCUMENTS

JP    3118657    1/2006

* cited by examiner

Primary Examiner—Henry W Tsai
Assistant Examiner—Hyun Nam
(74) Attorney, Agent, or Firm—Oblon, Spivak, McClelland, Maier & Neustadt, L.L.P.

(57) ABSTRACT

A USB memory includes: a USB terminal unit, a main unit which incorporates therein a NAND memory and a processor module; and a rotation portion which changes a relative position between the main unit and the USB terminal unit. The processor module switches an access management mode to a first access management mode or a second access management mode depending on the relative position between the main unit and the USB terminal unit. The processor module manages data stored in the NAND memory such that data having been stored under the first access management mode is rendered inaccessible to the host device with the second access management mode and that data having been stored under the second access management mode is rendered inaccessible to the host device with the first access management mode.

17 Claims, 11 Drawing Sheets

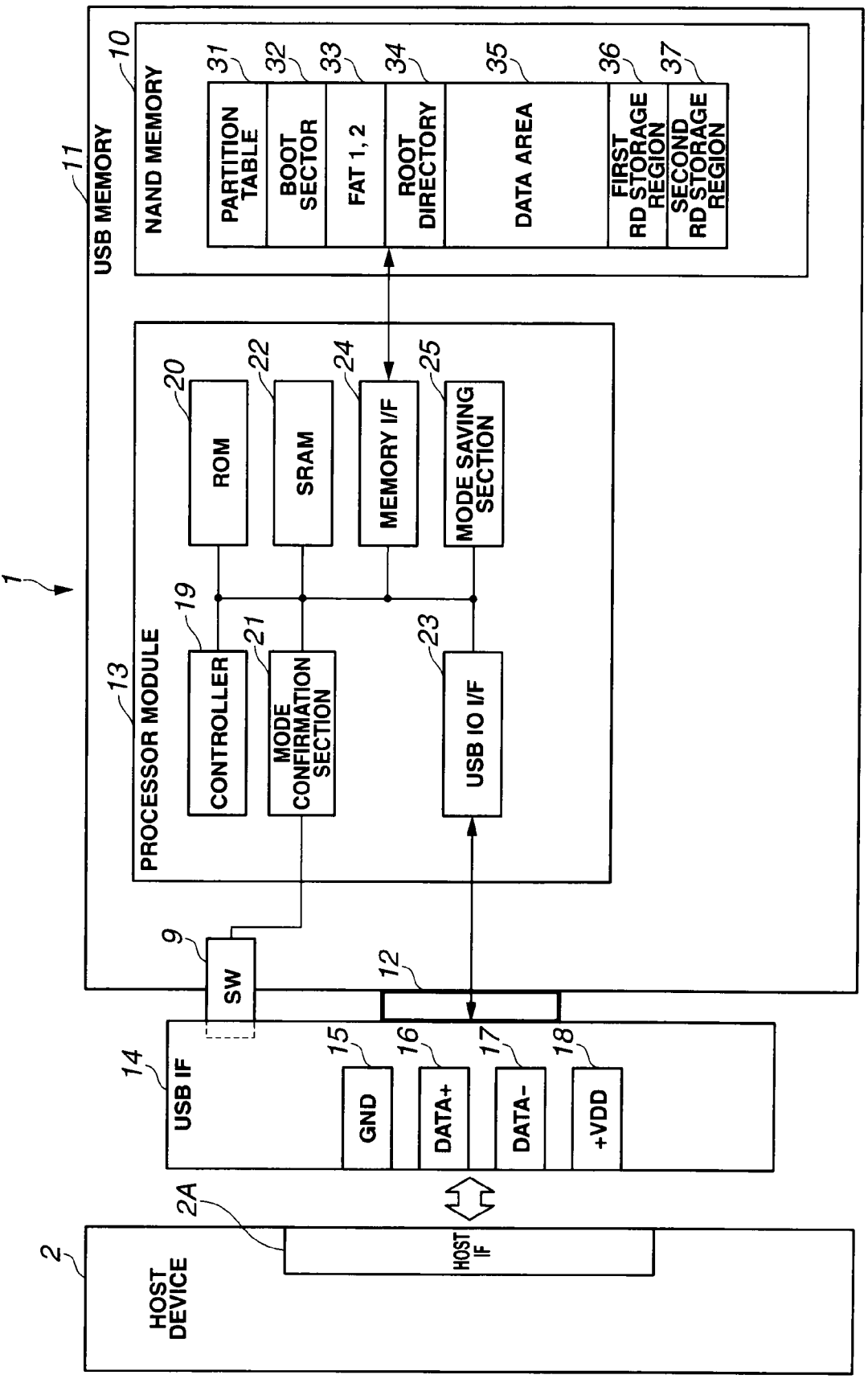

FIG.3

| | PREVIOUS ACCESS MODE | CURRENT ACCESS MODE | PARTICULAR OPERATION | RD DATA OF ACCESS MODE 1 (RD STORAGE REGION A) | RD DATA OF ACCESS MODE 2 (RD STORAGE REGION B) | REMARKS |
|---|---|---|---|---|---|---|
| (A) | 1 | 1 | NONE | STORING | STORING | ACCESSIBLE TO DATA OF ACCESS MODE 1 |
| (B) | 1 | 2 | STORING RD DATA OF ACCESS MODE 1 WRITING DATA OF ACCESS MODE 2 INTO RD | STORING | STORING | ACCESSIBLE TO DATA OF ACCESS MODE 2 STORING DATA OF ACCESS MODE 1 |
| (C) | 2 | 1 | STORING RD DATA OF ACCESS MODE 2 WRITING DATA OF ACCESS MODE 1 INTO RD | STORING | STORING | ACCESSIBLE TO DATA OF ACCESS MODE 1 STORING DATA OF ACCESS MODE 2 |
| (D) | 2 | 2 | NONE | STORING | STORING | ACCESSIBLE TO DATA OF ACCESS MODE 2 |

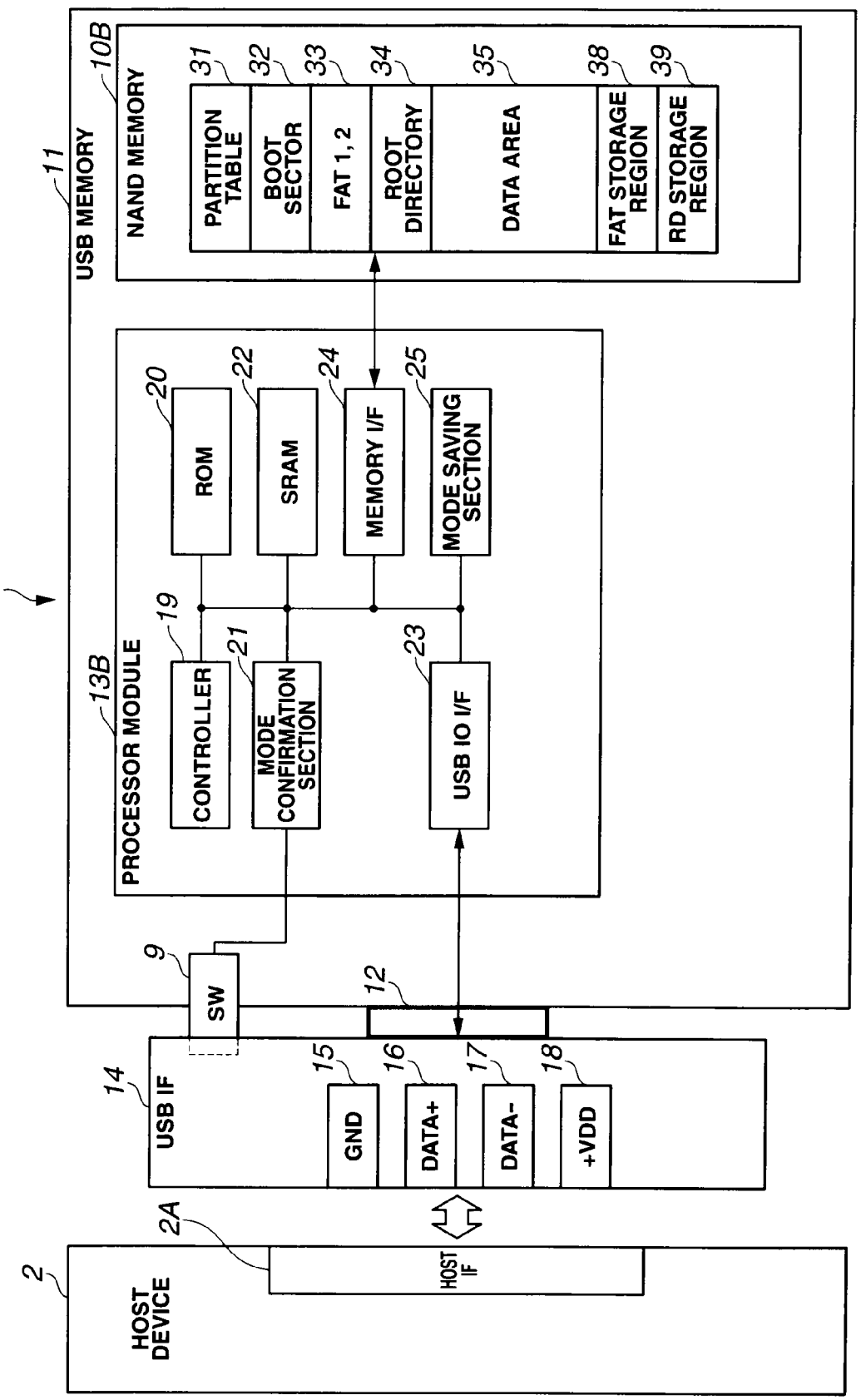

FIG.6

| | PREVIOUS ACCESS MODE | CURRENT ACCESS MODE | PARTICULAR OPERATION | RD DATA OF ACCESS MODE 1 (RD STORAGE REGION A) | RD DATA OF ACCESS MODE 2 (RD STORAGE REGION B) | REMARKS |
|---|---|---|---|---|---|---|
| (E) | 1 | 1 | NONE | STORING | – | ACCESSIBLE TO DATA OF ACCESS MODE 1 |
| (F) | 1 | 2 | STORING RD DATA OF ACCESS MODE 1 WRITING DATA OF ACCESS MODE 2 INTO RD | STORING | STORING | ACCESSIBLE TO DATA OF ACCESS MODE 2 STORING DATA OF ACCESS MODE 1 |
| (G) | 2 | 1 | STORING RD DATA OF ACCESS MODE 2 WRITING DATA OF ACCESS MODE 1 INTO RD | STORING | CLEARING | ACCESSIBLE TO DATA OF ACCESS MODE 1 CLEARING DATA OF ACCESS MODE 2 |
| (H) | 2 | 2 | NONE | STORING | STORING | ACCESSIBLE TO DATA OF ACCESS MODE 2 |

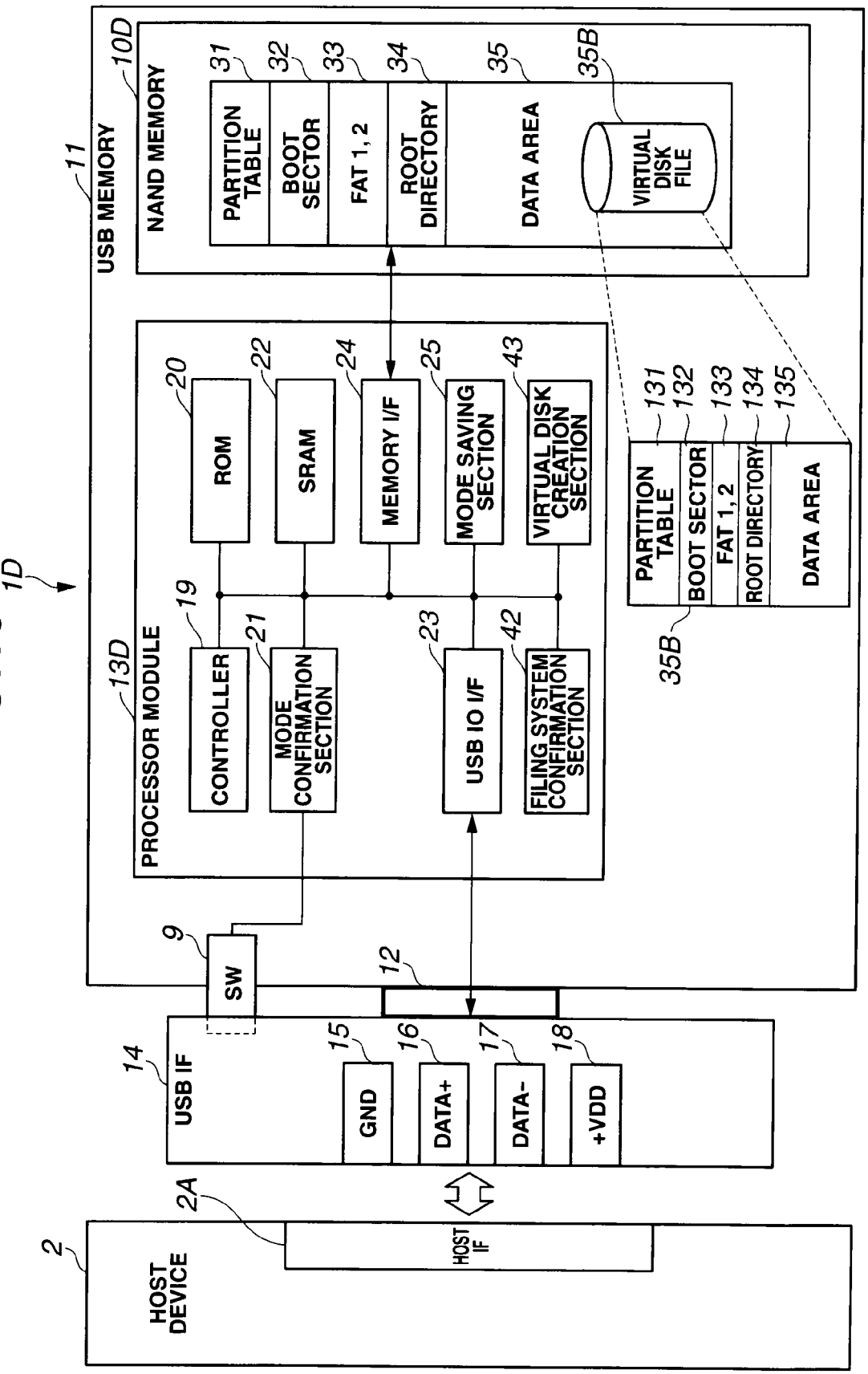

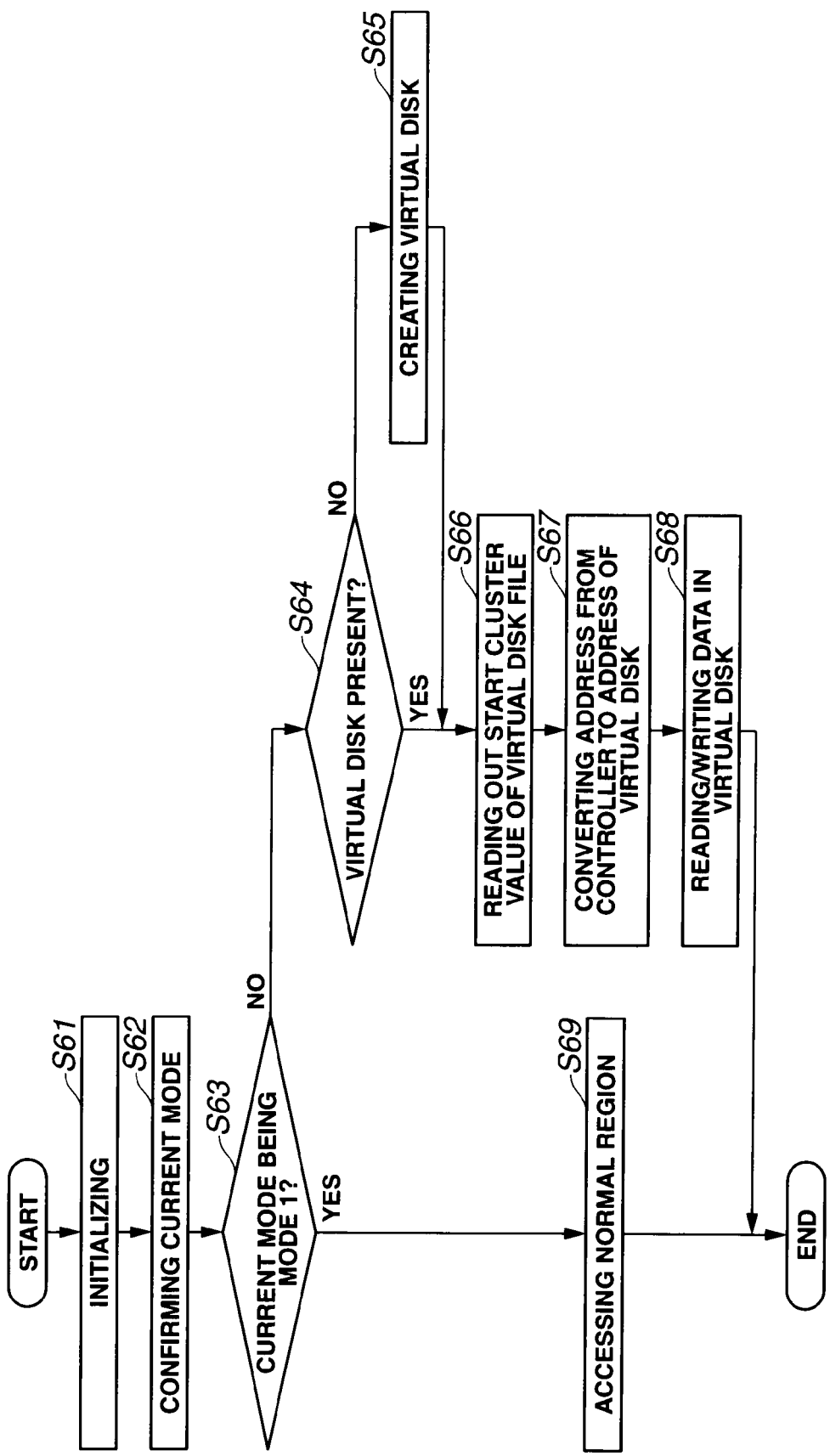

SEMICONDUCTOR MEMORY DEVICE AND METHOD OF CONTROLLING SEMICONDUCTOR MEMORY DEVICE

CROSS REFERENCE TO RELATED APPLICATION

This application claims the benefit of Japanese Application No. 2008-186305 filed in Japan on Jul. 17, 2008, the contents of which are incorporated herein by this reference.

BACKGROUND OF THE INVENTION

1. Field of the Invention

The present invention relates to a semiconductor memory device and a method of controlling a semiconductor memory device, and in particular, relates to a semiconductor memory device which has an external connection unit configured to connect with a host device and a main unit which has a built-in semiconductor memory unit that stores data of the host device, and to a method of controlling the semiconductor memory device.

2. Description of Related Art

In recent years, a semiconductor memory device, particularly a semiconductor memory device that stores data in a flash memory being a nonvolatile storage medium, has been developed. Now, such semiconductor memory devices are widely used as auxiliary memory devices for host devices such as personal computers, cellular phones, digital cameras, etc. As such host devices have come to handle data in large capacity, development of flash memories has progressed to achieve flash memories with larger capacity and which are further densified. In this respect, in recent years, NAND type flash memories in particular have come to be used frequently.

In a NAND type flash memory, electric charges injected to a charge accumulation layer through an insulating film are taken as information in a form of digital bit, and information is to be read out by measuring a change in a threshold voltage of a transistor depending on the amount of electric charges.

A USB memory device (hereinafter to be referred to as "USB memory") can be mentioned as an example of a small size semiconductor memory device, with good portability, that uses a NAND type flash memory. USB memory memories are widely used with personal computers, etc.

For example, Japanese Registered Utility Model No. 3118657 discloses a variable USB memory which performs signal access with a USB transmission interface or a multi-memory card transmission interface that includes transmission interfaces, etc. The transmission interfaces that the multi-memory card transmission interface includes may be an SD transmission interface, an MMC transmission interface and so forth.

As the USB memory has become larger in capacity, a user can store a large number of files in a single USB memory. Data to be stored in the USB memory can be roughly classified into two types of data; one type of data being data that is stored for some time for repeated use, and the other type of data being data that is stored for temporal use and can be deleted without any problem once it is used. Data stored in the USB memory for the purpose of data delivery, for instance, is temporarily used and can be deleted without any problem after use. In such case, however, since there should be plenty of storage capacity left in the USB memory, it often happens that a user will not delete such deletable data, i.e. unnecessary data, from the USB memory. Accordingly, the USB memory will have unnecessary data accumulated therein.

When there are a large number of files stored in the single USB memory, the user may have difficulties in finding out a desired file from the multiple files being stored. Moreover, when a large number of files are being stored in the single USB memory, the user may have difficulties in even determining which files are necessary and which files are not. Particularly, it will be difficult to determine whether the file is necessary or not after some time has passed since the file was first stored. Therefore, there are possibilities that the user will not be able to delete unnecessary files or will accidentally delete necessary files. At any rate, it is a burdensome work for the user to find out unnecessary files and delete such files.

On the other hand, USB memories are used quite often in delivering data to/from other persons. In such case, even when there is available storage capacity in the USB memory, storing the data in the USB memory for delivery while the USB memory has other data being stored, and connecting the USB memory to a host device that is used by someone else is questionable, since there is a possibility of data leakage. In other words, in connecting the USB memory to a host device that is used by another person, it is preferable that a USB memory which does not store any data other than the data for delivery is used. However, for this purpose, the user is required to delete all the data stored in the USB memory for storing the data for delivery.

SUMMARY OF THE INVENTION

According to one aspect of the present invention, a semiconductor memory device includes: a main unit which incorporates therein a semiconductor memory unit and a processor module which performs data management on data stored in the semiconductor memory unit; an external connection unit which establishes connection between the main unit and a host device; and a movable portion which changes a relative position between the main unit and the external connection unit. The processor module switches an access management mode for managing access of the host device to the semiconductor memory unit to a first access management mode or a second access management mode depending on the relative position between the main unit and the external connection unit, and manages the data stored in the semiconductor memory unit so that data having been stored under the first access management mode is rendered inaccessible to the host device with the second access management mode and that data having been stored under the second access management mode is rendered inaccessible to the host device with the first access management mode.

According to another aspect of the present invention, a method of controlling a semiconductor memory device includes: confirming, by a mode confirmation section, as to whether an access management mode is a first access management mode or a second access management mode based on a state of a switch portion that changes depending on a relative position between a main unit and an external connection unit which establishes connection between the main unit and a host device; acquiring information on a previous access management mode being stored in a mode saving section; and performing data management, by a processor module, on data stored in a semiconductor memory unit so that data having been stored under the first access management mode is rendered inaccessible to the host device with the second access management mode and that data having been stored under the second access management mode is rendered inaccessible to the host device with the first access management mode.

BRIEF DESCRIPTION OF THE DRAWINGS

FIG. 2 is a block diagram showing a configuration of the USB memory according to the first embodiment;

FIG. 3 is a chart for explaining an operation of the USB memory according to the first embodiment, at the time of start-up of the USB memory;

FIG. 5 is a block diagram showing a configuration of a USB memory according to a second embodiment;

FIG. 6 is a chart for explaining an operation of the USB memory according to the second embodiment, at the time of start-up of the USB memory;

FIG. 10 is a block diagram showing a configuration of a USB memory according to a fourth embodiment; and FIG. 11 is a flow chart for explaining a flow of an operation of the USB memory according to the fourth embodiment, at the time of start-up of the USB memory.

DETAILED DESCRIPTION OF PREFERRED EMBODIMENTS

First Embodiment

Figure 1A:
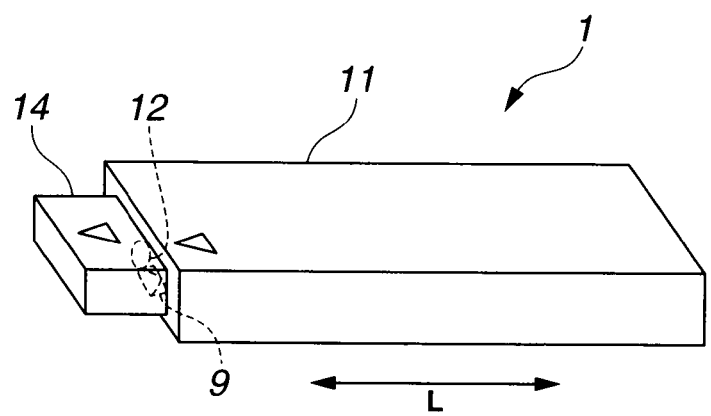
FIG. 1A is an explanatory diagram for illustrating a usage configuration of a USB memory which is a semiconductor memory device according to a first embodiment.
Figure 1B:
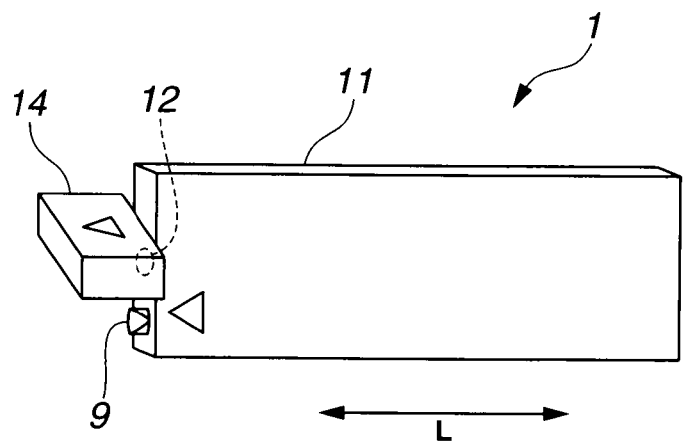
FIG. 1B is another explanatory diagram for illustrating the usage configuration of the USB memory which is the semiconductor memory device according to the first embodiment.

In the following, a USB memory 1 being a semiconductor memory device according to a first embodiment of the present invention will be described with reference to the drawings. FIG. 1A and FIG. 1B are explanatory diagrams for explaining a usage configuration of the USB memory being the semiconductor memory device according to the present embodiment. FIG. 2 is a block diagram showing a configuration of the USB memory being the semiconductor memory device according to the present embodiment.

As shown in FIG. 1A, FIG. 1B, and FIG. 2, a USB memory 1 has an interface signal terminal unit (hereinafter to be referred to as "USB terminal unit") 14 which is an external connection unit for establishing connection with a host device 2. The USB terminal unit 14 is compliant with the USB (Universal Serial Bus) standard. The USB terminal unit 14 is configured as including not only a terminal unit for establishing electrical connection but also an exterior member for protection of the terminal and for establishing physical connection with the host device 2. Moreover, the USB memory 1 has a main unit 11 that incorporates therein a NAND memory 10 and a processor module 13. The NAND memory 10 is a semiconductor memory unit that stores data received from the host device 2, and the NAND memory 10 is configured as having a NAND type flash memory. The processor module 13 is configured to perform data management of data stored in the NAND memory 10. As will be described later on, in the USB memory of the present embodiment, the NAND memory 10 has two data storage regions, and it will be set up as to which data storage region will be accessible based on an access management mode (hereinafter to be referred to simply as "mode" or "management mode") of which switching process is to be performed by the processor module 13.

Furthermore, as shown in FIG. 1A and FIG. 1B, the USB memory 1 has a rotation portion 12 which is a movable portion provided at a connecting part between the USB terminal unit 14, being the external connection unit, and the main unit 11. Therefore, in the USB memory 1, the USB terminal unit 14 and the main unit 11 are being configured as rotatable. That is, a relative position or a relative angle between the USB terminal unit 14 and the main unit 111 can be rendered variable by rotational movement.

Therefore, in the USB memory 1, the USB terminal unit 14 with a rectangular parallelepiped shape is rotatable with respect to an axis in a long axis direction (i.e. direction "L" as shown in FIG. 1A and FIG. 1B) of the main unit 111 with a rectangular parallelepiped shape. Here, a rectangular parallelepiped shape is a cuboid whose faces are all rectangular, or partly rectangular and partly square. However, it is not necessary that the USB memory 1 or the USB terminal unit 14 should be a complete rectangular parallelepiped. In design perspective, or in terms of improving handleability, it is also possible that some corners or faces are rounded, or some faces have approximate trapezoid shapes. Furthermore, on a face of the main unit 11 where the rotation portion 12 is arranged, it is not necessary that the rotation portion 12 is arranged in a center of the face of the main unit 11.

On a face of the main unit 11 where the USB terminal unit 14 is arranged, a switch portion 9 is provided. The switch portion 9 is to be used by a user in switching the management mode. The management mode will be described in more detail later. According to the change in the relative position between the USB terminal unit 14 and the main unit 11, that is, according to the rotation of the USB terminal unit 14, the switch portion 9 will be switched to a released state or a pressed state.

Therefore, when the USB memory 1 is used under a normal state (i.e. at a relative angle of 0 degree), the switch portion 9 will be pressed by the USB terminal unit 14 to come to a closed state, as shown in FIG. 1A. On the other hand, as shown in FIG. 1B, when the main unit 11 is rotated 90 degrees with respect to the USB terminal unit 14 such that the relative angle becomes 90 degrees, the switch portion 9 will become a non-pressed released state. Accordingly, the user can switch the state of the switch portion 9 by changing the relative position between the USB terminal unit 14 and the main unit 11 by simply rotating the main unit 11 with respect to the USB terminal unit 14.

The processor module 13 is to perform switching of the management mode according to the state of the switch portion 9. Thus, when the switch portion 9 is being pressed, the processor module 13 will switch to a first access management mode (hereinafter to be referred to as "first mode") so as to control access of the host device 2 to the NAND memory 10 being the semiconductor memory unit. When the switch portion 9 is not being pressed, the processor module 13 will switch to a second access management mode (hereinafter to be referred to as "second mode") for controlling access. As a matter of course, it is also possible that the correspondence relationship between the state of the switch portion 9 and the management mode is opposite to the one described above.

With respect to the USB memory 1, since the relative angle between the USB terminal unit 14 and the main unit 11 can change by 90 degrees, the USB memory 1 when connected to the host device 2 will vary greatly in outer appearance, as shown in FIG. 1A and FIG. 1B. Because the outer appearance of the USB memory 1 can change apparently, the user can confirm the state of the switch portion 9 with certainty by acknowledging the change.

It has been described as an example that the USB memory 1 has the rotation portion 12 that can rotate to make the relative position between the USB terminal unit 14 and the main unit 11 vary by 90 degrees, whereby the switch portion 9 becomes a pressed state when the relative position is at 0 degree or becomes a non-pressed state when the relative position is at 90 degrees. However, it is also possible that the USB memory 1 has a rotation portion which can rotate to make the relative position between the USB terminal unit 14 and the main unit 11 vary by 180 degrees, whereby the switch portion 9 becomes a pressed state when the relative position is at 0 degree or becomes a non-pressed state when the relative position is at 180 degrees.

Instead of the rotation portion 12, the movable portion can be a slidable portion which can make the USB terminal unit 14 slide on a surface of the main unit 11 where the USB terminal unit 14 is being arranged. Moreover, the movable portion can be a bending portion which can make the USB terminal unit 14 bend 90 degrees with respect to the surface of the main unit 11 where the USB terminal unit 14 is being arranged.

Therefore, the movable portion should be sufficient as long as it functions to make the relative position between the main unit 11 and the USB terminal unit 14 variable. Accordingly, a structure, etc. of the movable portion can be selected for use from among heretofore known movable structures.

In the above-described USB memory 1, the switch portion 9 arranged at the main unit 11 becomes a physically pressed state due to the rotation of the USB terminal unit 14. However, such switch portion 9 has been shown as an example, and thus the switch portion is not limited to the form of the switch portion 9 as described above. As the switch portion, it is also possible to use a non-contact detection sensor such as an optical sensor, a magnetic sensor, or the like. Furthermore, as another possible option, the switch portion can be arranged as being contained inside the rotation portion 12 at a position unnoticeable from outside.

Now, a configuration of the USB memory 1 will be described with reference to FIG. 2.

As mentioned earlier, the USB memory 1 transmits/receives data to/from the host device 2 via a USB standard interface. The USB standard includes a specification called the USB Mass Storage Class which enables an auxiliary memory device to be connected to the host device 2. As long as the host device 2 is a device with an operating system which is compliant with this specification, the host device 2 does not need to have a driver installed, for the host device 2 will be able to identify a device connected thereto through a USB bus as a memory device within its standard function. A semiconductor memory device that uses such mechanism is defined as a USB memory.

The USB memory 1 being the semiconductor memory device according to the present embodiment has two kinds of management modes in which data management, that is, access management with respect to the access of the host device 2 to the NAND memory 10, is performed. The USB memory 1 will operate in one of these management modes, either the first mode or the second mode. The processor module 13 is to switch, according to the state of the switch portion 9, the access management mode in which access management with respect to the access of the host device 2 to the NAND memory 10 will be performed. Therefore, data stored under the first mode will be inaccessible to the host device 2 with the second mode, while data stored under the second mode will be inaccessible to the host device 2 with the first mode.

The USB terminal unit 14 has four terminals which are; a VBUS (+VDD) terminal 18 being a power source terminal, a DATA+terminal 16 and a DATA−terminal 17 being data terminals, and a GND terminal 15 being a ground terminal.

The processor module 13 is configured with a controller 19, an SRAM 22, a ROM 20, a USBIO interface 23, a memory interface 24, a mode confirmation section 21, and a mode saving section 25. The controller 19 is a main control section of the USB memory 1. The SRAM 22 is used as a work buffer memory. The ROM 20 stores a control program. The USBIO interface 23 is to communicate with the USB terminal unit 14. The memory interface 24 configures an interface between the processor module 13 and the NAND memory 10. The mode confirmation section 21 is to confirm a value of the switch portion 9. The mode saving section 25 is to save the management mode from the previous power-on.

The processor module 13 manages data to be stored in the NAND memory 10 by a FAT (File Allocation Tables) filing system. As shown in FIG. 2, the NAND memory 10 controlled by the processor module 13 has six regions that any ordinary NAND memory managed by the FAT filing system has, the six regions including; a partition table 31 of a filing system format for file accessing, a boot sector 32, a FAT region 33 including FAT 1 and FAT 2, a root directory (hereinafter to be also referred to as "RD") region 34, and a data area 35. In addition to those six regions, the NAND memory 10 also has an RD storage region A (36) being a first RD storage region, and an RD storage region B (37) being a second RD storage region, which are not provided in an ordinary NAND memory managed by the FAT filing system. The RD storage region A (36) and the RD storage region B (37) are regions to which only the processor module 13 can access and the host device 2 cannot access. A state of the host device 2 not being able to gain access indicates that the host device 2 is not being able to identify contents of the files, i.e. data.

In this case, data in the root directory region 34 is information that indicates where in the data area 35 the stored data of files in the data area 35 are being stored. Furthermore, the FAT 2 is a back-up dada of the FAT 1.

The mode confirmation section 21 is to determine as to whether the management mode is the first mode or the second mode based on the relative position between the main unit 11 and the USB terminal unit 14. That is, the mode confirmation section 21 determines that the management mode is the first mode when the switch portion 9 is at a pressed state whereas the mode confirmation section 21 determines that the management mode is the second mode when the switch portion 9 is at a non-pressed state. The mode confirmation section 21 is to report the controller 19 about the determination result. The controller 19 is to change the initial data in the NAND memory 10 according to the management mode.

The mode saving section 25 is to save the management mode from the previous access, that is, the mode saving section 25 is to save the management mode at the time when the USB memory 1 was connected to the host device 2. After the whole initializing process within the USB memory 1 is completed, the mode saving section 25 is to obtain from the mode confirmation section 21 information on the management mode being set, and store that information on the management mode.

The processor module 13 is to store data of the root directory region 34 in a case of the management mode being the first management mode to the first RD storage region 36, and store data of the root directory region 34 in a case of the management mode being the second management mode to the second RD storage region 37. Based on the information on the management mode that the mode confirmation section 21 has confirmed at the time of start-up, the processor module 13 is to copy the data of the first RD storage region 36 or the data of the second RD storage region 37 onto the root directory region 34.

In the USB memory 1, the data area of the NAND memory 10 are commonly used between the first mode and the second mode, and available data for the user, that is, accessible data for the host device 2, will be switched depending on the management mode.

Moreover, although it has been described that the management mode is to be switched to the first mode when the switch portion 9 is pressed while the management mode is to be switched to the second mode when the switch portion 9 is not pressed, the setting of the switch portion 9 is not limited to such pattern. The setting of the switch portion 9 should be appropriate as long as it is possible to distinguish between the first mode and the second mode.

Now, an operation of the USB memory 1 at the time of start-up will be described with reference to FIG. 3. FIG. 3 is a chart for explaining the operation of the USB memory according to the present embodiment, at the time of start-up of the USB memory.

(A) When the previous management mode, i.e. the management mode at the time when the USB memory 1 was previously connected to the host device 2, is the first mode, and the current management mode, i.e. the management mode at the time of start-up, is also the first mode, the processor module 13 will not perform any particular operation. In this case, the host device 2 will not be able to access the data having been stored under the second mode, and not only that, the host device 2 will not be able to even identify the presence of that data. On the other hand, the host device 2 will be able to access the data having been stored under the first mode, and also newly store data to the NAND memory 10 with the first mode. Moreover, the respective data of the root directory region for the respective first mode and the second mode will be stored.

(B) When the previous management mode is the first mode while the current management mode is the second mode, the data at the time of the firs mode is being stored in the root directory region 34 at the time of start-up. Therefore, the processor module 13 is to write the data of the root directory region 34 into the first RD storage region 36. Then, the processor module 13 is to write the data of the second RD storage region 37 into the root directory region 34. Thereby, the root directory data of the first mode having been stored in the root directory region 34 will be replaced by the root directory data of the second mode. In this case, the host device 2 will not be able to access the data having been stored under the first mode, and not only that, the host device 2 will not be able to even identify the presence of that data. On the other hand, the host device 2 will be able to access the data having been stored under the second mode, and also newly store data to the NAND memory 10 with the second mode.

At this point, since the root directory data of the first mode is to be stored in the first RD storage region 36, the user will be able to access from the host device 2 to the data having been stored under the first mode if the management mode at the time of the following start-up is rendered the first mode.

(C) When the previous management mode is the second mode while the current management mode is the first mode, the data at the time of the second mode is currently being stored in the root directory region 34. Therefore, the processor module 13 is to write the data of the root directory region 34 into the second RD storage region 37. Then, the processor module 13 is to write the data of the first RD storage region 36 into the root directory region 34. Thereby, the root directory data of the second mode having been stored in the root directory region 34 will be replaced by the root directory data of the first mode. In this case, the host device 2 will not be able to access the data having been stored under the second mode, and not only that, the host device 2 will not be able to even identify the presence of that data. On the other hand, the host device 2 will be able to access the data having been stored under the first mode, and also newly store data to the NAND memory 10 with the first mode.

At this point, since the root directory data of the second mode is to be stored in the second RD storage region 37, the user will be able to access from the host device 2 to the data having been stored under the second mode if the management mode at the time of the following start-up is rendered the second mode.

(D) When the previous management mode is the second mode, and the current management mode is also the second mode, the processor module 13 will not perform any particular operation. In this case, the host device 2 will not be able to access the data having been stored under the first mode, and not only that, the host device 2 will not be able to even identify the presence of that data. On the other hand, the host device 2 will be able to access the data having been stored under the second mode, and also newly store data to the NAND memory 10 with the second mode. Moreover, the respective data of the root directory region for the respective first mode and the second mode will be stored.

Figure 4:
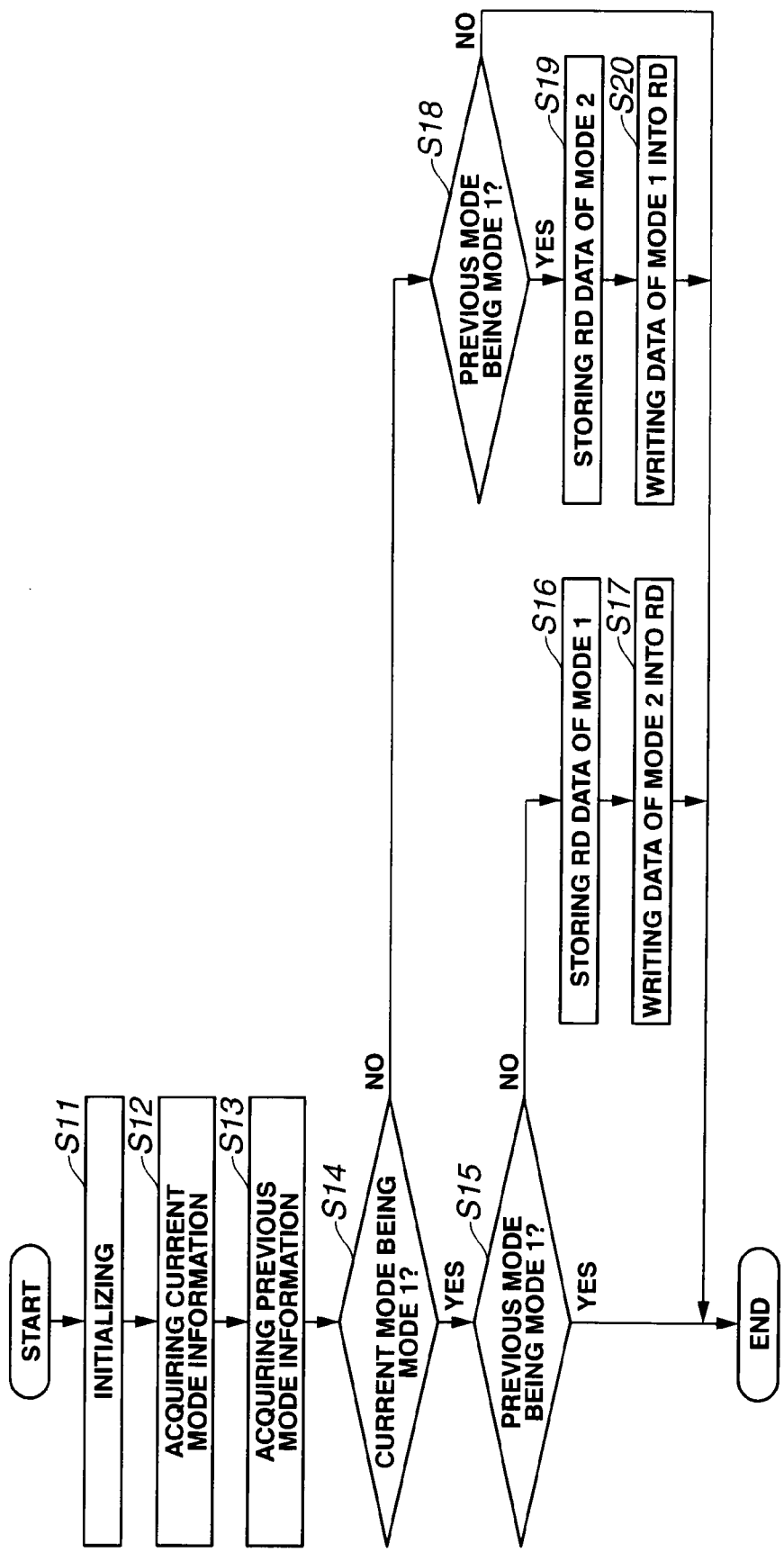
FIG. 4 is a flow chart for explaining a flow of the operation of the USB memory according to the first embodiment, at the time of start-up of the USB memory.

Now, a flow of the operation of the USB memory 1 at the time of start-up will be described with reference to FIG. 4. FIG. 4 is a flow chart for explaining the flow of the operation of the USB memory according to the present embodiment, at the time of start-up of the USB memory.

<Step S11>

When the USB memory 1 is connected to the host device and powered on, an initializing process inside the processor module 13 and an initializing process of the NAND memory 10, and so forth, will be executed.

<Step S12>

Management Mode Information Acquisition Step

Next, the processor module 13 will confirm the state of the switch portion 9 with the mode confirmation section 21 to acquire information on the current management mode.

<Step S13>

Previous Management Mode Information Acquisition Step

Next, the processor module 13 will acquire information on the previous management mode from the mode saving section 25 where the information on the previous management mode is being stored.

<Step S14, Step S15>

Data Management Step (Case (A) of FIG. 3)

When the previous management mode is the first mode (step S14; Yes), and the current management mode is also the first mode (step S15; Yes), the same root directory as the one from the previous time can be used in the operation of the USB memory 1. Therefore, the processor module 13 will not perform any particular process. Then, the host device 2 will be able to access the data having been stored under the first mode, and also newly store data to the NAND memory 10 with the first mode.

<Step S14, Step S15>

Data Management Step (Case (B) of FIG. 3)

When the previous management mode is the first mode (step S14; Yes), and the current management mode is the second mode (step S15; No), the data stored in the root directory region 34 at the time of start-up will be the data having been stored under the first mode.

<Step S16>

The processor module 13 will write the data of the root directory region 34 into the first RD storage region 36.

<Step S17>

The processor module 13 will write the data of the second RD storage region 37 into the root directory region 34 in order to let the data having been stored under the second mode accessible to the host device 2. Thereby, the data of the first mode in the root directory region 34 will be replaced by the data of the second mode. Therefore, the host device 2 will become unable to identify the data having been stored under the first mode. On the other hand, the host device 2 will be able to access the data having been stored under the second mode, and also newly store data to the NAND memory 10 with the second mode.

<Step S14, Step S18>

Data Management Step (Case (C) of FIG. 3)

When the previous management mode is the second mode (step S14; No), and the current management mode is the first mode (step S18; Yes), the data stored in the root directory region 34 at the time of start-up will be the data having been stored under the second mode.

<Step S19>

The processor module 13 will write the data of the root directory region 34 into the second RD storage region 37.

<Step S20>

The processor module 13 will write the data of the first RD storage region 36 into the root directory region 34 in order to let the data having been stored under the first mode accessible to the host device 2. Thereby, the data of the second mode in the root directory region 34 will be replaced by the data of the first mode. Therefore, the host device 2 will become unable to identify the data having been stored under the second mode. On the other hand, the host device 2 will be able to access the data having been stored under the first mode, and also newly store data to the NAND memory 10 with the first mode.

<Step S14, Step S18>

Case (D) of FIG. 3

When the previous management mode is the second mode (step S14; No), and the current management mode is also the second mode (step S18; No), the USB memory 1 can use the same root directory as the one from the previous start-up. Therefore, the processor module 13 will not perform any particular process. Then, the host device 2 will be able to access the data having been stored under the second mode, and also newly store data to the NAND memory 10 with the second mode.

As described above, in the USB memory 1, the processor module 13 is to manage data by the FAT filing system, and switch the data in the root directory region 34 to the data having been stored in the RD storage region 36 or 37 depending on the management mode. Therefore, the USB memory 1 is capable of easily switching data accessible to the host device 2.

Accordingly, the user can separate the usage of the USB memory 1 by the management modes, for example, in such a way as to use the first mode for storing data for temporal storage and use the second mode for storing data for long-term storage. Moreover, the user can decide to use the USB memory 1 in the first mode in cases of delivering data to/from other persons, for instance. By doing so, the user does not need to be concerned about having data having been stored under the second mode leaked from the USB memory 1 even in the event that the USB memory 1 is to be connected to a host device that is used by someone else.

Furthermore, with respect to the USB memory 1, it is possible to switch the management mode by simply changing the relative position between the USB terminal unit 14 and the main unit 11 by the rotational movement. Moreover, with respect to the USB memory 1, the user can confirm the management mode with certainty by acknowledging the outer appearance of the USB memory 1 at the time when the USB memory 1 is connected to the host device 2.

As described above, the USB memory 1 being the semiconductor memory device according to the present embodiment has: the USB terminal unit 14 which is the external connection unit that establishes connection with the host device 2; the main unit 11 which incorporates therein the NAND memory 10 being the semiconductor memory unit that includes the first data storage region and the second data storage region, and the processor module 13 which performs data management of data stored in the semiconductor memory unit; and the rotation portion 12 which is the movable portion that changes the relative position between the main unit 11 and the USB terminal unit 14. The processor module switches the management mode to the first mode or the second mode depending on the relative position between the main unit 11 and the USB terminal unit 14. Each of the management modes is responsible for different data storage region to which the host device can access. The data having been stored in the first data storage region under the first mode is inaccessible to the host device 2 in the second mode, while the data having been stored in the second data storage region under the second mode is inaccessible to the host device 2 in the first mode.

With the USB memory 1 being the semiconductor memory device according to the present embodiment, file management can be easily implemented, and it has been proved that the USB memory 1 is a semiconductor memory device that is fairly convenient for the user.

It has been described as an example that the USB memory 1 stores the data of the root directory region 34 according to the respective management modes to the respective RD storage regions. However, along with the data of the root directory region 34, the USB memory 1 can also store data, etc. of the FAT region 33 according to the respective management modes.

Second Embodiment

In the following, a USB memory 1B being a semiconductor memory device according to a second embodiment of the present invention will be described with reference to the drawings. FIG. 5 is a block diagram showing a configuration of the USB memory being the semiconductor memory device according to the present embodiment. Since the USB memory 1B has a configuration similar to that of the USB memory 1 according to the first embodiment, the same reference numerals will be used for referring to the same configuration elements, and descriptions of the redundant configuration elements will be omitted.

With respect to the USB memory 1 according to the first embodiment, the data having been stored in the NAND memory 10 is to be remained stored even when the management mode is changed by the switch portion 9. However, with respect to the USB memory 1B according to the present embodiment, the data having been stored under the second mode will be automatically deleted when the management mode switches from the second mode to the first mode. That is, with respect to the USB memory 1B, the user is to use the second mode as the management mode in storing data for temporal storage.

As shown in FIG. 5, the USB memory 1B has a FAT storage region 38 in a NAND memory 10B instead of the second RD storage region 37 as provided in the USB memory 1 according to the first embodiment. The FAT storage region 38 is a region where data of the FAT region 33 in the case of the first mode is to be stored. When the management mode shifts to the second mode, a processor module 13B is to write the data of the FAT region 33 into the FAT storage region 38. Furthermore, when the management mode returns from the second mode to the first mode, the processor module 13B is to write the data of the FAT storage region 38 into the FAT region 33. Thereby, the data having been stored under the second mode will have FAT information erased and the file will be deleted on the filing system, rendering the file inaccessible to the host device 2. The data of the root directory region 34 is to be stored in an RD storage region 39 as in the case of the USB memory 1. In this respect, however, the RD storage region 39 in the USB memory 1B is an RD storage region that corresponds to the RD storage region A (36) in the USB memory 1, for there is no data of the root directory region 34 in the second mode.

Now, an operation of the USB memory 1B at the time of start-up will be described with reference to FIG. 6. FIG. 6 is a chart for explaining the operation of the USB memory according to the present embodiment, at the time of start-up of the USB memory.

(E) When the previous management mode, i.e. the management mode at the time when the USB memory 1B was previously connected to the host device 2, is the first mode, and the current management mode, i.e. the management mode at the time of start-up, is also the first mode, the processor module 13B will not perform any particular operation. In this case, the host device 2 will not be able to identify the data having been stored under the second mode. On the other hand, the host device 2 will be able to access the data having been stored under the first mode, and also newly store data to the NAND memory 10B with the first mode.

(F) When the previous management mode is the first mode while the current management mode is the second mode, the data at the time of the first mode is being stored in the root directory region 34 at the time of start-up. Therefore, the processor module 13B is to store the data of the root directory region 34 into the RD storage region 39. Furthermore, the processor module 13B is to store the data of the FAT region 33 into the FAT storage region 38. Then, the processor module 13B is to rewrite the whole data of the root directory region 34 to "0". Therefore, although the data, etc. having been stored under the first mode is actually remained stored, the host device 2 will recognize that the whole data has been cleared, or in other words, deleted. Accordingly, the host device 2 will be able to access the USB memory 1B with the second mode.

(G) When the previous management mode is the second mode while the current management mode is the first mode, the processor module 13B is to write the data of the RD storage region 39 into the root directory region 34. Moreover, the processor module 13B is to write the data of the FAT storage region 38 into the FAT region 33. Thereby, the whole data of the second mode will be erased by being overwritten by the data of the first mode. In the NAND memory, in overwriting, the region will first be formatted to have data newly written.

As a result, the USB memory 1B will return to the sate when it was used last time under the first mode. Then, the host device 2 will be able to access the data having been stored under the first mode, and also newly store data to the NAND memory 10B with the first mode.

(H) When the previous management mode is the second mode, and the current management mode is also the second mode, the processor module 13B will not perform any particular operation. In this case, the host device 2 will be able to access the USB memory 1B with the second mode.

As described above, with the USB memory 1B, the NAND memory 10B will be used only temporally in the second mode, and unnecessary data can be automatically deleted without requiring the user to do any deleting operation for deleting the unnecessary data.

Figure 7:
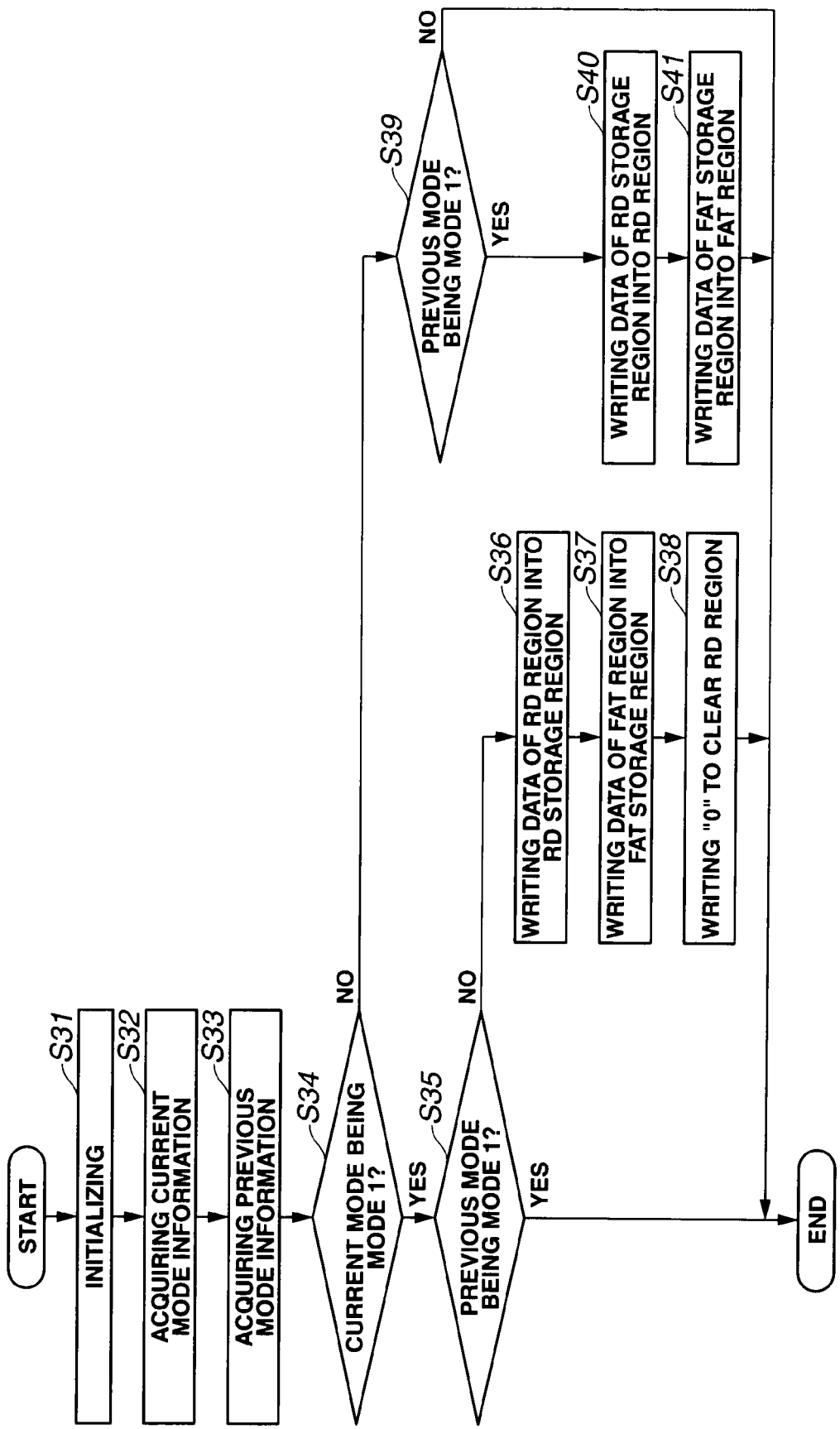
FIG. 7 is a flow chart for explaining a flow of the operation of the USB memory according to the second embodiment, at the time of start-up of the USB memory.

Now, a flow of the operation of the USB memory 1B at the time of start-up will be described with reference to FIG. 7. FIG. 7 is a flow chart for explaining the flow of the operation of the USB memory according to the present embodiment, at the time of start-up of the USB memory.

<Step S31>

When the USB memory 1B is connected to the host device and powered on, an initializing process inside the processor module 13B and an initializing process of the NAND memory 10B, and so forth, will be executed.

<Step S32>

Next, the processor module 13B will confirm the state of the switch portion 9 with the mode confirmation section 21 to acquire information on the current management mode.

<Step S33>

Next, the processor module 13B will acquire information on the previous management mode from the mode saving section 25 where the information on the previous management mode is being stored.

<Step S34, Step S35>

Case (E) of FIG. 6

When the previous management mode is the first mode (step S34; Yes), and the current management mode is also the first mode (step S35; Yes), the USB memory 1B can use the same root directory region and the same FAT region as the ones from the previous time. Therefore, the processor module 13B will not perform any particular process. Then, the host device 2 will be able to access the data having been stored under the first mode, and also newly store data to the NAND memory 10B with the first mode.

<Step S34, Step S35>

Case (F) of FIG. 6

When the previous management mode is the first mode (step S34; Yes), and the current management mode is the second mode (step S35; No), the data stored in the root directory region 34 will be the data at the time of the first mode.

<Step S36>

The processor module 13B will write the data of the root directory region 34 into the RD storage region 39.

<Step S37>

The processor module 13B will write the data of the FAT region 33 into the FAT storage region 38.

<Step S38>

The processor module 13B will rewrite the whole data of the root directory region 34 to "0" in order to write the data stored under the second mode.

<Step S34, Step S39>

Case (G) of FIG. 6

When the previous management mode is the second mode (step S34; No), and the current management mode is the first mode (step S39; Yes), the data stored in the root directory region 34 at the time of start-up will be the data at the time of the second mode.

<Step S40>

The processor module 13B will write the data stored in the RD storage region 39 into the root directory region 34.

<Step S41>

The processor module 13B will write the data stored in the FAT storage region 38 into the FAT region 33. Thereby, the USB memory 1B will return to the state at the time of the first mode. Then, the host device 2 will be able to access the data having been stored under the first mode, and also newly store data to the NAND memory 10B with the first mode.

At this time, the data having been stored in the data area 35 under the second mode will be deleted on the filing system (i.e. an automatic delete step), and thus the host device 2 will become unable to access the data having been stored under the second mode.

<Step S34, Step S39>

Case (H) of FIG. 6

When the previous management mode is the second mode (step S34; No), and the current management mode is also the second mode (step S39; No), the USB memory 1B can use the same root directory as the one from the previous start-up. Therefore, the processor module 13B will not perform any particular process, but the host device 2 will be able to newly store data to the NAND memory 10B with the second mode.

As described above, in addition to the advantageous effects that the USB memory 1 has, the USB memory 1B also has an advantageous effect that the second mode can provide. That is, with respect to the USB memory 1B, the second mode is a mode in which the NAND memory 10B is used temporally, and thus unnecessary data will be automatically deleted (i.e. the automatic delete step) without requiring the user to do any deleting operation for deleting the unnecessary data. Accordingly, the USB memory 1B is a semiconductor memory device which may be further convenient for a user than the USB memory 1.

Third Embodiment

Figure 8:
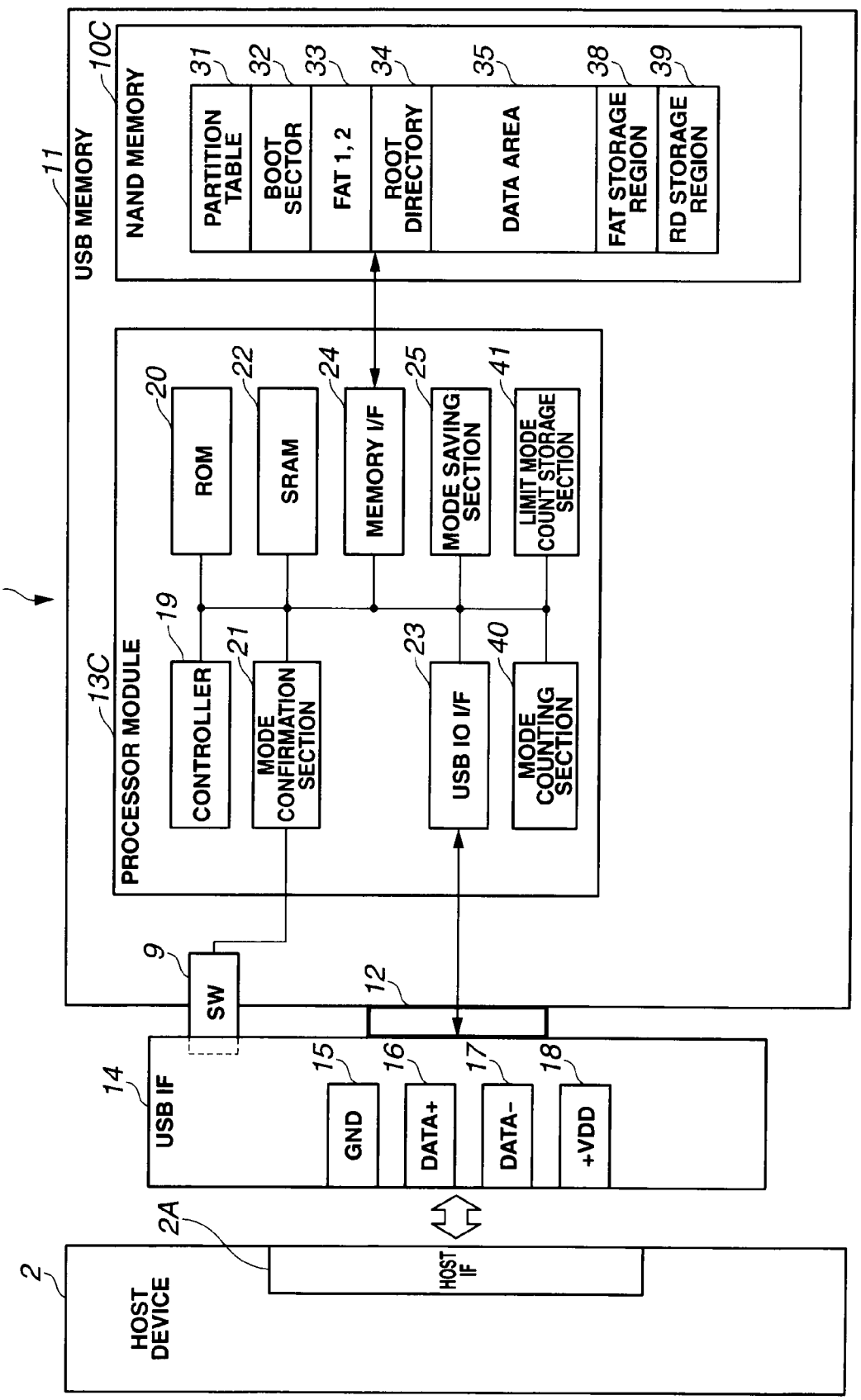
FIG. 8 is a block diagram showing a configuration of a USB memory according to a third embodiment.

In the following, a USB memory 1C being a semiconductor memory device according to a third embodiment of the present invention will be described with reference to the drawings. FIG. 8 is a block diagram showing a configuration of the USB memory being the semiconductor memory device according to the present embodiment. Since the USB memory 1C has a configuration similar to that of the USB memory 1B according to the second embodiment, etc., the same reference numerals will be used for referring to the same configuration elements, and descriptions of the redundant configuration elements will be omitted.

The USB memory 1B according to the second embodiment is to erase the data having been stored under the second mode each time the switch portion 9 is switched, that is, each time the management mode is switched from the second mode to the first mode. However, in the USB memory 1C according to the present embodiment, the number of times the power is turned on at the USB memory 1C while being set to the second mode will be counted, that is, the number of start-ups booted by the USB memory 1C being connected to the host device 2 under the second mode will be counted. When the number of start-ups becomes greater than or equal to a predetermined number, the USB memory 1C is to delete the data having been stored under the second mode (i.e. a deleting step).

As shown in FIG. 8, the configuration of the USB memory 1C is similar to that of the USB memory 1B being the semiconductor memory device according to the second embodiment except that the USB memory 1C is additionally provided with a mode counting section 40 and a limit mode count storage section 41. The mode counting section 40 is to acquire the management mode information from the information in the mode confirmation section 21 at the time of start-up of the USB memory 1C, and increase the number of an internal counter by one count when the management mode is the second mode. The limit mode count storage section 41 is where the limit number of mode counts, i.e. the predetermined number of start-ups for determining deletion of the data stored under the second mode, is being stored. In this case, it is preferable that the data on the predetermined number of start-ups is being set up in the limit mode count storage section 41 by default before the shipment of the USB memory 1C, so that the user may not be able to rewrite the data.

Figure 9:
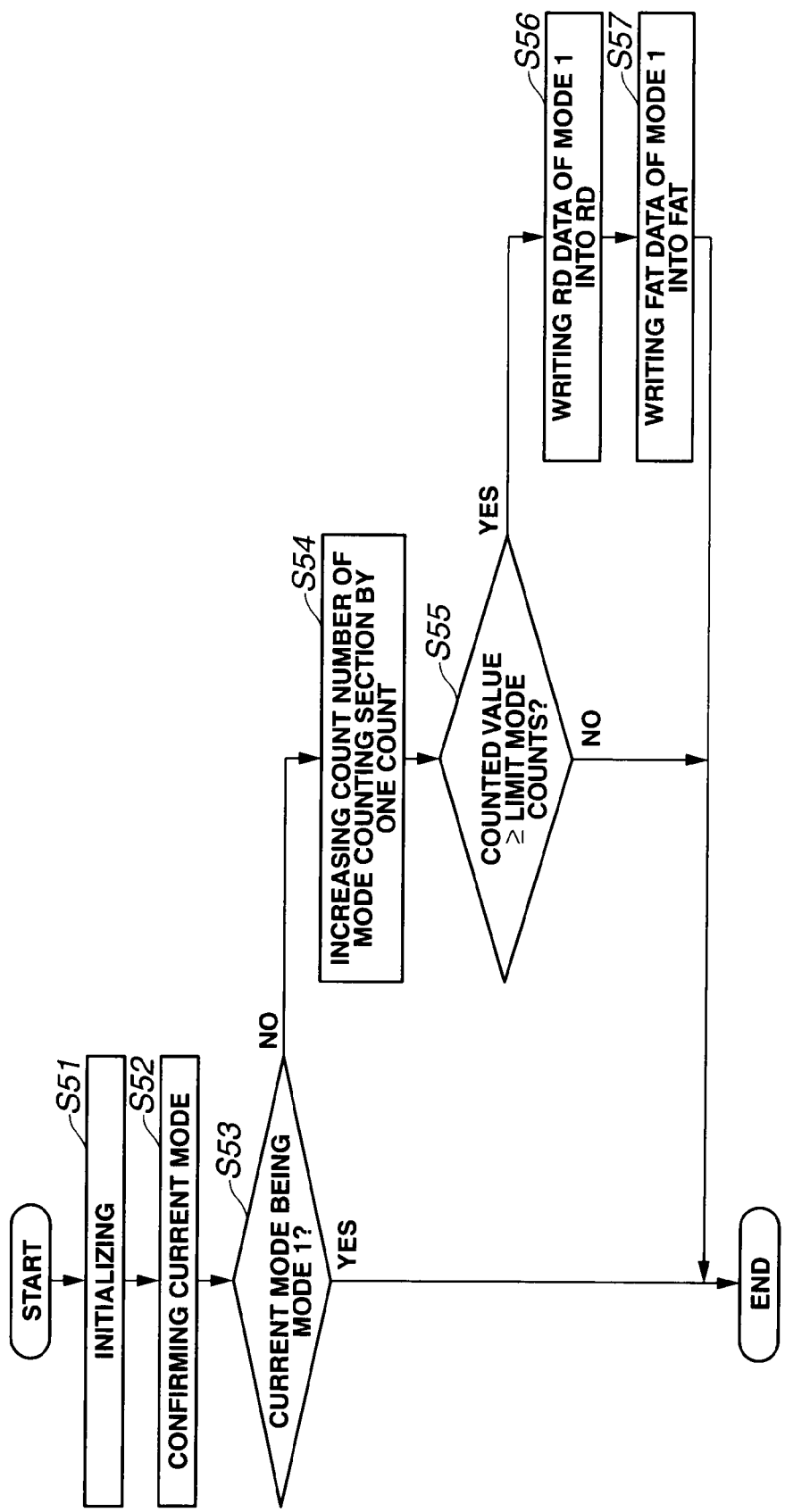
FIG. 9 is a flow chart for explaining a flow of an operation of the USB memory according to the third embodiment, at the time of start-up of the USB memory.

Now, a flow of an operation of the USB memory 1C at the time of start-up will be described with reference to FIG. 9. FIG. 9 is a flow chart for explaining the flow of the operation of the USB memory according to the present embodiment, at the time of start-up of the USB memory.

<Step S51>

Start-up Step

When the USB memory 1C is connected to the host device and powered on, an initializing process inside a processor module 13C and an initializing process of a NAND memory 10C, and so forth, will be executed.

<Step S52>

Current Management Mode Information Acquisition Step

Next, the processor module 13C will confirm the sate of the switch portion 9 with mode confirmation section 21 to acquire information on the current management mode.

<Step S53>

When the management mode at the time of start-up is the first mode (step S53; Yes), the processor module 13C will not perform any particular process. Then, the host device 2 will be able to access the data having been stored under the first mode, and also newly store data to the NAND memory 10C with the first mode.

<Step S54>

Count-up Step

When the management mode at the time of start-up is the second mode (step S53; No), the processor module 13C will add one count to the count number stored in the counter inside the mode counting section 40.

<Step S55>

Count Number Comparison Step

The processor module 13C will compare the count number stored in the mode counting section 40 with the predetermined limit number of mode counts stored in the limit mode count storage section 41. When the count number is smaller than the limit number of mode counts (step S55; No), the processor module 13C will not perform any particular process. Then, the host device 2 will be able to access the data having been stored under the second mode, and also newly store data to the NAND memory 10C with the second mode.

<Step S56>

Deleting Step

At step S55, when the count number is determined as greater than or equal to the number of mode clearance start-ups that is the limit number of mode counts (Step S55; Yes), the processor module 13C will write "0" on the whole data in the root directory region 34. Moreover, the processor module 13C will return the count number stored in the mode counting section 40 back to "0".

<Step S57>

Deleting Step

Next, the processor module 13C will write data of the FAT storage region 38 to the FAT region 33. Thereby, the whole stored data having been stored under the second mode will be deleted. At this time, the data, etc. having been stored under the first mode will not be deleted. Therefore, when the management mode is returned to the first mode, the host device 2 will be able to read out the data having been stored under the first mode. Furthermore, when the management mode is changed from the second mode to the first mode, the data having been stored under the second mode will remain stored, as in the case of the USB memory 1, but once the number of start-ups with the second mode becomes greater than or equal to the limit number of mode counts for determining deletion of data having been stored under the second access management mode, the data having been stored under the second mode will be deleted.

It has been described as an example that, in the USB memory 1C, the data having been stored under the second mode will be deleted when the number of accesses, or in other words, the number of start-ups with the second mode, becomes greater than or equal to the limit number of mode counts. However, similarly to the case of the USB memory 1B, it is also possible with the USB memory 1C to have the data stored under the second mode be deleted when the management mode changes from the second mode to the first mode.

In addition, with respect to the timing of deleting of data stored under the second mode, the timing can be managed not only based on the limit number of mode counts but also based on the cumulative time in which the USB memory 1C has been used in the second mode.

Fourth Embodiment

In the following, a USB memory 1D being a semiconductor memory device according to a fourth embodiment of the present invention will be described with reference to the drawings. FIG. 10 is a block diagram showing a configuration of the USB memory being the semiconductor memory device according to the present embodiment. FIG. 11 is a flow chart for explaining a flow of an operation of the USB memory being the semiconductor memory device according to the present embodiment, at the time of start-up of the USB memory. Since the USB memory 1D has a configuration similar to that of the USB memory 1 according to the first embodiment, etc., the same reference numerals will be used for referring to the same configuration elements, and descriptions of the redundant configuration elements will be omitted.

In the USB memory 1D, a NAND memory 10D as being a memory unit has a data area 35 which is a first data area that the host device 2 can access with the first mode, and a data area 135 which is a second data area that the host device 2 can access with the second mode. The data area 135 is provided inside a virtual disk file 35B. The second data area being the data area 135 is a dada area of the virtual disk file 35B which is created inside the first data area. Therefore, with the first mode, the host device 2 will be able to identify the presence of the virtual disk file 35B in the data area 35 although the host device 2 cannot access any of the files stored in the data area 135 inside the virtual disk file 35B.

A processor module 13D of the USB memory 1D has a filing system confirmation section 42 and a virtual disk creation section 43. When the management mode is the second mode, the virtual disk creation section 43 will create the virtual disk file 35B in the data area 35. With respect to the file to be created, a file name is to be a predetermined name such as "m2data.dat", for example, and a file volume is to be a predetermined file volume of 500 MB, for example. The file to be created will be a virtual disk file that has a structure similar to a FAT file structure of the NAND memory 10D, and so will include a partition table 131, a boot sector 132, FATs 1 and 2 (133), a root directory 134, and the data area 135.

The filing system confirmation section 42 has a function to render the virtual disk file 35B accessible when the management mode is the second mode, the virtual disk file 35B being created by the virtual disk creation section 43 and present as a file in the data area 35 inside the NAND memory 10D. When the management mode is the second mode, the filing system confirmation section 42 will read out the file under the name of "m2data.dat", and outputs the various data in the file as if they are the dada inside the NAND memory 10D.

The USB memory 1D has two operation modes: a normal recording mode, and a temporal recording mode, which can be switched based on the setting of the switch portion 9. In a case of the temporal recording mode, in the USB memory 1D, the virtual disk file 35B will be created in the normal recording region, and the virtual disk file 35B will be accessed. In a case of the normal recording mode, in the USB memory 1D, the data having been stored temporally will be able to be deleted easily by deleting the virtual disk file 35B. Therefore, with the USB memory 1D, the user can render the files recorded with different modes files with hidden attributes with respect to one another, by a simple switching operation of the switch portion 9. Furthermore, with the USB memory 1D, the user can easily delete the files having been stored under the temporal recording mode, by a simple switching operation of the switch portion 9.

Now, a flow of an operation of the USB memory 1D at the time of start-up will be described with reference to FIG. 11. FIG. 11 is a flow chart for explaining the flow of the operation of the USB memory according to the present embodiment, at the time of start-up of the USB memory.

<Step S61>

Start-up Step

When the USB memory 1D is connected to the host device and powered on, an initializing process inside the processor module 13D and an initializing process of the NAND memory 10D, and so forth, will be executed.

\<Step S62\>

Current Management Mode Information Acquisition Step

Next, the processor module 13D will confirm the sate of the switch portion 9 with mode confirmation section 21 to acquire information on the current management mode.

\<Step S63\>

When the management mode at the time of start-up is the first mode (step S63; Yes), the processor module 13D will not perform any particular process. Then, the host device 2 will be able to access the data having been stored under the first mode, and also newly store data to the NAND memory 10D with the first mode.

\<Step S64\>

When the management mode at the time of start-up is the second mode (step S63; No), the processor module 13D will confirm with the filing system confirmation section 42 as to whether there is information on the virtual disk file 35B in the root directory region 34 inside the NAND memory 10D. The filing system confirmation section 42 will search for the predetermined file name, "m2data.dat", for instance.

\<Step S65\>

Virtual Disk Creation Step

When the virtual disk file 35B is not present (step S64; No), the processor module 13D will let the virtual disk creation section 43 create the virtual disk file 35B in the root directory region 34. The virtual disk file 35B, for example, has a file name such as "m2data.dat", and a size of 500 MB. Moreover, as for data regions, the virtual disk file 35B has a partition table, a boot sector, FATs 1 and 2, a root directory, and a data area, where filing system information are stored. Processes after step S65 are the same as those in a case when the virtual disk file 35B is confirmed as being present (step S64; Yes).

\<Step S66\>

The processor module 13D will acquire start cluster information from the file information on the virtual disk file 35B being stored in the root directory region 34.

\<Step S67\>

When an address for accessing to the NAND memory 10D is sent from the host device 2, the filing system confirmation section 42 will convert the received address to the data address of the virtual disk file 35B. That is, the filing system confirmation section 42 will acquire information on a FAT chain from the FAT 1 region 133, and calculate an address of the data area 135 based on the acquired address.

\<Step S68\>

The filing system confirmation section 42 will transmit the calculated address to the controller 19, whereupon the controller 19 will acquire from the NAND memory 10D the file data in the data area 135 inside the virtual disk file 35B and transmit the acquired file data to the host device 2.

With the USB memory 1D, when the management mode is the first mode, the presence of the file under the name of "m2data.dat", which is the virtual disk file 35B, can be identified as a normal file. Therefore, if the user wishes to delete all the data recorded under the second mode, the user can have the data deleted by just simply deleting the file "m2data.dat". After that, if the USB memory 1D is booted again in the second mode, the virtual disk file 35B will not be there, and thus the virtual disk creation section 43 will newly create the file "m2data.dat" as the virtual disk file 35B. In the present embodiment, although the virtual disk file 35B has been given the file name "m2data.dat", the file name is not limited to such file name. The file name can be determined arbitrarily by the manufacture, etc. of the USB memory 1D. Furthermore, the virtual disk file 35B should not necessarily be a file with a predetermined size, while the virtual disk file 35B can be a file with a variable size whose maximum volume value is being specified.

In this case, it is necessary that the USB memory 1D has inside the processor module 13D a kind of filing system confirmation section 42 that has a filing system analysis section. However, the filing system confirmation section 42 can also be a kind of a filing system confirmation section with a simple filing system analysis function. Such simple filing system analysis function may be a section that has a function of adding a flag to the data area 35 such that the region of the virtual disk file 35B can be rendered identifiable, a section that provides a table for managing the address of the virtual disk file region inside the data area 35, or the like.

Moreover, with the USB memory 1D, it is also possible to arrange such that the virtual disk file 35B used in the second mode will be automatically deleted when the management mode switches to the first mode.

As described above, since the USB memory 1D has the virtual disk file 35B, and the processor module 13D is to store data into the virtual disk file 35B in the second mode, the USB memory 1D can achieve advantageous effects similar to those of the USB memory 1, etc.

As described above, the USB memory 1D includes: the USB connection unit which is the USB interface; the processor module 13D; the NAND memory 10D; the rotation axis which is a movable portion that can rotate the main unit; the switch portion which is operated by the rotation axis in switching modes; the mode confirmation section which confirms the value of the switch portion to determine the management mode; the filing system confirmation section; and the virtual disk creating section. With the USB memory 1D, when the management mode is the first management mode, the data area 35 in the NAND memory 10D will be accessed. On the other hand, when the management mode is the second management mode, the data area 135 within the virtual disk file 35B will be accessed. Moreover, in the case of the second management mode, the USB memory 1D creates the virtual disk file 35B. At this time, the data of the virtual disk file 35B will be in a FAT filing system format.

Modified Example of Fourth Embodiment

In the following, a USB memory 1E (not shown) being a semiconductor memory device as a modified example of the fourth embodiment of the present invention will be described. Since the USB memory 1E has a configuration similar to that of the USB memory 1D according to the fourth embodiment, etc., the same reference numerals will be used for referring to the same configuration elements, and descriptions of the redundant configuration elements will be omitted.

With the USB memory 1D being the semiconductor memory device according to the fourth embodiment, the virtual disk file 35B is created in the data area 35, and the normal data area 35 and the data area 135 inside the virtual disk file 35B are switched according to the management mode. In this respect, the USB memory 1E of the present modified example has two partitions formed inside the NAND memory 10D, and the partition accessible to the host device 2 is switched according to the management mode. As a matter of course, each of the partitions is to have a so called "hidden attribute" assigned to, in order to be accessible according to the management mode.

In the case of the USB memory 1E that performs switching by the partitions, a certain file under a predetermined name such as "parti2.dat" is to be created in a data area 35C (not shown) of the partition 1, for example. Then, if the certain file of the predetermined file name is deleted in the first mode, a data region of the partition 2 will be formatted. Thereby, the user will be able to delete the data easily.

As described above, the USB memory 1E switches the partitions in the NAND memory 10D according to the management mode. Furthermore, the USB memory 1E creates a certain file in the data area 35 of the NAND memory 10D, and returns the data of the partition 2 to the initial value in the case when the certain file is deleted by the user.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A semiconductor memory device comprising:
   a main unit;
   an external connection unit which establishes connection between the main unit and a host device;
   a movable portion which changes a relative position between the main unit and the external connection unit;
   a semiconductor memory unit incorporated in the main unit; and
   a processor module incorporated in the main unit,
   the processor module switching an access management mode for managing access of the host device to the semiconductor memory unit to a first access management mode or a second access management mode depending on the relative position between the main unit and the external connection unit, and managing data stored in the semiconductor memory unit so that data having been stored under the first access management mode is rendered inaccessible to the host device with the second access management mode and that data having been stored under the second access management mode is rendered inaccessible to the host device with the first access management mode.

2. The semiconductor memory device according to claim 1, further comprising:
   a switch portion arranged at the main unit in such a way as to be switched depending on the relative position between the main unit and the external connection unit, wherein
   the external connection unit is rotatable by the movable portion with respect to an axis in a long axis direction of the main unit that has a rectangular parallelepiped shape, and
   the processor module switches the access management mode based on a state of the switch portion.

3. The semiconductor memory device according to claim 2, wherein
   an outer appearance of the semiconductor memory device at the time when the semiconductor memory device is connected with the host device changes depending on the relative position between the main unit and the external connection unit.

4. The semiconductor memory device according to claim 1, wherein
   the external connection unit is a USB terminal unit in conformity with the USB standard, and
   the semiconductor memory unit is a NAND type flash memory unit.

5. The semiconductor memory device according to claim 1, further comprising:
   a switch portion arranged at the main unit in such a way as to be switched depending on the relative position between the main unit and the external connection unit,
   a mode saving section which saves the access management mode; and
   a mode confirmation section which confirms a state of the switch portion.

6. The semiconductor memory device according to claim 1, wherein
   the processor module manages the data by a FAT filing system, and
   the semiconductor memory unit includes a first root directory storage region which stores a root directory according to the first access management mode, and a second root directory storage region which stores a root directory according to the second access management mode.

7. The semiconductor memory device according to claim 1, wherein
   the processor module manages the data by a FAT filing system, and
   the semiconductor memory unit includes a FAT storage region which stores data of a FAT region in the case of the access management mode being the first access management mode.

8. The semiconductor memory device according to claim 1, wherein
   the processor module deletes the data having been stored in the semiconductor memory unit under the second access management mode when the access management mode is switched from the second access management mode to the first access management mode.

9. The semiconductor memory device according to claim 1, further comprising:
   a mode counting section which increases a count number of an internal counter by one count when the access management mode is the second access management mode at start-up; and
   a limit mode count storage section storing a limit number of mode counts which is a predetermined number of counts for determining deletion of data having been stored under the second access management mode, wherein
   the processor module deletes the data having been stored in the semiconductor memory unit under the second access management mode when the count number of the internal counter of the mode counting section is greater than or equal to the limit number of mode counts stored in the limit mode count storage section.

10. The semiconductor memory device according to claim 1, wherein
    the processor module, when the access management mode is the second access management mode, stores the data in a virtual disk file in the semiconductor memory unit, the virtual disk file including a root directory and a data area.

11. A method of controlling a semiconductor memory device comprising:
    confirming, by a mode confirmation section, as to whether an access management mode is a first access management mode or a second access management mode based on a state of a switch portion that changes depending on a relative position between a main unit and an external connection unit which establishes connection between the main unit and a host device;
    acquiring information on a previous access management mode being stored in a mode saving section; and performing data management, by a processor module, on data stored in a semiconductor memory unit so that data having been stored under the first access management mode is rendered inaccessible to the host device with the second access management mode and that data having been stored under the second access management mode is rendered inaccessible to the host device with the first access management mode.

12. The method of controlling a semiconductor memory device according to claim 11, wherein the processor module manages the data by a FAT filing system, and the semiconductor memory unit includes a first root directory storage region which stores a root directory according to the first access management mode, and a second root directory storage region which stores a root directory according to the second access management mode.

13. The method of controlling a semiconductor memory device according to claim 11, wherein the processor module manages the data by a FAT filing system, and the semiconductor memory unit includes a FAT storage region which stores data of a FAT region in the case of the access management mode being the first access management mode.

14. The method of controlling a semiconductor memory device according to claim 11, further comprising:

automatically deleting, by the processor module, the data having been stored in the semiconductor memory unit under the second access management mode when the access management mode is switched from the second access management mode to the first access management mode.

15. The method of controlling a semiconductor memory device according to claim 11, further comprising:

increasing a count number of an internal counter in a mode counting section by one count when the access management mode is the second access management mode at start-up;

comparing the count number of the mode counting section with a predetermined number of counts being stored in a limit mode count storage section in order to determine as to whether the count number of the mode counting section is greater than or equal to the predetermined number of counts, the predetermined number of counts being set for determining deletion of data having been stored under the second access management mode; and deleting the data having been stored in the semiconductor memory unit under the second access management mode when the count number of the mode counting section is confirmed, as a result of the comparison, as being greater than or equal to the limit number of mode counts.

16. The method of controlling a semiconductor memory device according to claim 11, wherein the processor module, when the access management mode is the second access management mode, stores the data in a virtual disk file in the semiconductor memory unit, the virtual disk file including a root directory and a data area.

17. A semiconductor memory device comprising:

a main unit having a rectangular parallelepiped shape;

an external connection unit, having a rectangular parallelepiped shape, which establishes connection between the main unit and a host device and which is in conformity with the USB standard;

a rotation portion which can rotate a relative angle between the main unit and the external connection unit with respect to an axis in a long axis direction of the main unit;

a switch portion arranged at the main unit in such a way that a contact point thereof can be switched by being pressed by the external connection unit depending on the relative angle between the main unit and the external connection unit;

a NAND type flash memory unit arranged at the main unit; and a processor module arranged at the main unit, the processor module switching an access management mode for managing access of the host device to the NAND type flash memory unit to a first access management mode or a second access management mode depending on a state of the switch portion, and managing data stored in the NAND type flash memory unit so that data having been stored into the NAND type flash memory unit under the first access management mode is rendered inaccessible to the host device with the second access management mode and that data having been stored into the NAND type flash memory unit under the second access management mode is rendered inaccessible to the host device with the first access management mode.

* * * * *